United States Patent [19]

Martin

[11] 4,155,864

[45] May 22, 1979

[54] SILICONE COMPOSITIONS HAVING IMPROVED SPRAY FLAMMABILITY RESISTANCE

[75] Inventor: William H. Martin, Yorktown Heights, N.Y.

[73] Assignee: Union Carbide Corporation, New York, N.Y.

[21] Appl. No.: 837,983

[22] Filed: Sep. 29, 1977

[51] Int. Cl.$^2$ ............................ H01B 3/46; C10M 3/44
[52] U.S. Cl. .................................. 252/63.7; 252/8.1; 252/78.3; 260/448.2 S; 336/94; 361/315
[58] Field of Search ......................... 252/63.7, 64, 78.3, 252/8.1, 49.6; 361/315; 336/94; 174/17 LF; 260/448.2 S

[56] References Cited

U.S. PATENT DOCUMENTS

| | | | |
|---|---|---|---|
| 2,468,869 | 5/1949 | Daudt | 252/63.7 X |
| 2,614,989 | 10/1952 | Hunter et al. | 252/49.6 |
| 2,960,474 | 11/1960 | Furby et al. | 252/78.3 |
| 3,091,590 | 5/1963 | Furby et al. | 252/78.3 |
| 3,108,153 | 10/1963 | Feick et al. | 260/448.2 S X |
| 4,011,168 | 3/1977 | Uhlmann | 252/63.7 |

*Primary Examiner*—Harris A. Pitlick
*Attorney, Agent, or Firm*—Reynold J. Finnegan

[57] ABSTRACT

Silicone compositions having improved spray flammability resistance comprising a major amount of poly(dimethylsiloxane) fluid and a minor amount of a poly(diorganosiloxane) polymer; a process for improving the spray flammability resistance of poly(dimethylsiloxane) fluids; and improved electrical devices the improvement comprising employing as the liquid dielectric composition of such devices said silicone compositions.

46 Claims, No Drawings

SILICONE COMPOSITIONS HAVING IMPROVED SPRAY FLAMMABILITY RESISTANCE

BACKGROUND OF THE INVENTION

This invention relates to novel silicone compositions and more particularly to silicone compositions having improved spray flammability resistance.

In recent years the search for potential alternatives to the use of organic liquids whose environmental consequences are suspect, e.g. polychlorinated biphenyls, in such areas as hydraulic fluids, heat transfer fluids, transformer coolants, dielectric mediums, and the like, which are employed in closed equipment such as transformers, capacitors, and the like, has become increasingly important. Low viscosity poly(dimethylsiloxane) fluids have been proposed as an alternative liquid for such types of commercial applications. While such siloxane fluids are generally recognized as having low fire potential due to their chemical/thermal stability and high flask, fire and auto-ignition temperatures, low viscosity poly(dimethylsiloxane) fluids in the form of spray or atomized particles are combustible and such type of incineration is a commonly recommended means for their disposal. Thus, in applications where the low viscosity poly(dimethylsiloxane) fluid could be under pressure, such as in heat transfer, hydraulic, transformer, capacitor, or other closed equipment, and suddenly released there is a greater than normal fire potential if ignition sources are also present. For instance, the Factory Mutual's Spray Flammability Test is a commonly recognized test which simulates a potential fire hazard which might occur in the event of a line rupture carrying a fluid under pressure. Low viscosity poly(dimethylsiloxane) fluids per se have been found to burn vigorously by this test.

SUMMARY OF THE INVENTION

It has now been discovered that silicone compositions which involve employing low viscosity poly(dimethylsiloxane) fluids can be prepared that have improved spray fire resistance by adding to said fluids a minor amount of a high molecular weight poly(diorganosiloxane) polymer.

Therefore, it is an object of this invention to provide a novel method for improving the spray flammability resistance of low viscosity poly(dimethylsiloxane) fluids which comprises adding to said fluids a minor amount of a high molecular weight poly(diorganosiloxane) polymer. It is another object of this invention to provide novel silicone compositions having improved spray flammability resistance consisting essentially of a major amount of a low viscosity poly(dimethylsiloxane) fluid and a minor amount of a high molecular weight poly(diorganosiloxane) polymer. It is a further object of this invention to provide novel dielectric fluids having improved spray flammability resistance consisting essentially of a major amount of a low viscosity poly(dimethylsiloxane) fluid and a minor amount of a high molecular weight poly(diorganosiloxane) polymer. It is still a further object of this invention to provide improved electrical devices containing a dielectric fluid wherein the improvement comprises employing as the dielectric fluid a composition having improved spray flammability resistance consisting essentially of a major amount of a low viscosity poly(dimethylsiloxane) fluid and a minor amount of a high molecular weight poly(diorganosiloxane) polymer. Other objects and advantages of this invention will become readily apparent from the following description and appended claims.

More particularly, one aspect of this invention is directed to a silicone composition consisting essentially of (A) from about 90 to about 99.93 parts by weight of a trimethyl end-blocked poly(dimethylsiloxane) fluid having a viscosity of about 7 to 50 centistokes at about 25° C. and (B) from about 10 to about 0.07 parts by weight of a poly(diorganosiloxane) polymer having a weight average molecular weight of at least about 60,000, with the proviso that said composition of (A) and (B) has a viscosity of about 20 to about 100 centistokes at about 25° C.

DESCRIPTION OF THE PREFERRED EMBODIMENTS

The trimethyl end-blocked poly(dimethylsiloxane) fluids and methods for their preparation, which are employed in this invention are well known in the art. Such fluids are also commonly referred to as merely poly(dimethylsiloxanes) or dimethylpolysiloxanes. These siloxane fluids as employed herein can have a viscosity ranging from about 7 to about 50 centistokes and more preferably from about 10 to about 30 centistokes. It is to be understood as employed herein and in the claims the viscosity of said fluids are measured according to ASTM Test Method D-445 at about 25° C. published in the 1975 Book of the America Society for Testing and Materials. It is of course to be further understood that while the trimethyl end-blocked poly(dimethylsiloxane) fluids used in this invention can be discrete chemical compounds they are usually mixtures of various discrete siloxane species, due at least in part, to the fact that the starting materials used to produce the siloxane fluids are themselves mixtures. Likewise, it is to be understood that the novel silicone compositions of this invention encompass employing a single type of trimethyl end-blocked poly(dimethylsiloxane) fluid or a mixture of two or more of said poly(dimethylsiloxane) fluids having different viscosities within the viscosity range given above.

The high molecular weight poly(diorganosiloxane) polymers which are employed in this invention are essentially linear polymers having a weight average molecular weight of at least about 60,000. The upper limit of the weight average molecular weight of said polymers is not critical and can be any amount; it obviously being governed merely by the upper limit of the viscosity of about 100 centistokes for the novel silicon compositions of this invention. Thus, it is to be understood that said polymers may have weight average molecular weights of about two to three million or higher if desired. Such polymers and/or methods for their preparation are well known in the art and include, e.g. high molecular weight poly(diorganosiloxane) homopolymers and poly(diorganosiloxane) base gums shown for example in U.S. Pat. Nos. 2,445,794; 2,803,619; 2,819,236; 2,954,357; 3,183,205; 3,219,726; and 3,696,068, the disclosures of which are incorporated herein by reference thereto. Said polymers contain organic pendant groups and silicones atoms in the ratio of from about 1.95 to about 2.05 organo groups per silicon atom. Illustrative of the type of substituents that comprise said pendant groups are hydrogen, hydrocarbon radicals free of aliphatic unsaturation such as methyl, ethyl, amyl, phenyl, and the like, olefinic hydrocarbon radicals such as vinyl, allyl, cyclohexyl, and the like, halosubstituted hydrocarbon radicals such as bromo-, chloro- and fluoro- substituted alkyl (e.g. methyl, ethyl, propyl, butyl, etc.) and aryl (e.g. phenyl) groups, and the like, and cyano-substituted hydrocarbon groups such as cyanoalkyl radicals, etc., and the like.

More preferably the poly(diorganosiloxane) polymers employed in this invention have a weight average molecular weight of at least about 400,000 to about 2 million and include those essentially linear polymers comprising diorganosiloxy units selected from the class consisting of dimethylsiloxy, diethylsiloxy, diphenylsiloxy, methylethylsiloxy, methylphenylsiloxy, ethylphenylsiloxy, cyanopropyl methylsiloxy, trifluoropropyl methylsiloxy, methylvinylsiloxy, ethylvinylsiloxy, phenylvinylsiloxy, divinylsiloxy and the like, which include the various homopolymers, copolymers and terpolymers having said siloxy units. Specific examples of some of the more preferred diorganopolysiloxane polymers are homopolymers of dimethylsiloxy units, homopolymers of diethylsiloxy units, copolymers of dimethylsiloxy and methylvinylsiloxy units, copolymers of diethylsiloxy and methylvinylsiloxy units, copolymers of dimethylsiloxy and methylphenylsiloxy units, copolymers of dimethylsiloxy and diphenylsiloxy units, terpolymers of dimethylsiloxy, diphenylsiloxy and methylvinylsiloxy units, terpolymers of diethylsiloxy, dimethylsiloxy and methylvinylsiloxy units. Of course, it is understood that such poly(diorganosiloxane) polymers are normally mixtures of various discrete siloxane species due in part to the fact that the starting materials used to produce them are also normally mixtures. Likewise, it is to be understood that the novel silicone compositions of this invention encompass employing a single type of poly(diorganosiloxane) polymer or if desired a mixture of two or more of said poly(diorganosiloxane) polymers having different siloxy units and/or different weight average molecular weights and that the end-blocking organo groups of such polymers are insignificant as compared with the total number of organo groups attached to the silicon atoms of the high molecular weight poly(diorganosiloxane) polymers and thus inconsequential in terms of their amount and effect on the nature of said polymers. Therefore said polymers can be end-blocked in any conventional manner. When olefinically unsaturated monovalent hydrocarbon radicals, e.g. a vinyl radical, are present in the poly(diorganosiloxane) polymers, it is generally preferred that from about 0.02 to about 0.8 weight percent of the siloxy units in said polymers be olefinically siloxy units such as vinyl siloxy units, e.g. methylvinylsiloxy units, although higher amounts of such olefinic siloxy units can be present if desired. Most preferably the poly(diorganosiloxane) polymer is a homopolymer of dimethylsiloxy units, a copolymer of dimethylsiloxy and methylvinylsiloxy units, or a terpolymer of dimethylsiloxy methylvinylsiloxy and diphenylsiloxy units.

The weight average molecular weight for the various poly(diorganosiloxane) polymers employed in this invention is measured by Gel Permeation Chromatography using a calibration curve showing the relationship between the respective elution volumes established for poly(dimethylsiloxane) fluids of different molecular weights and the respective known molecular weights of such fluids. In establishing the calibration curve, the various poly(dimethylsiloxane) fluids were in solution in trichloroethylene solvent using Styragel ® (Waters Associates Inc.) packed columns. In measuring the molecular weights of the polymers described herein, the elution volumes observed for any particular polymer product (in trichloroethylene solvent) were equated with the corresponding elution volumes of the calibration curve, and the molecular weights associated with those particular elution volumes were calculated as the molecular weight of the polymer product. The use of Gel Permeation Chromatography for measuring molecular weights in discussed in "Polymer Fractionation" (ed. Manfred J. R. Cantow, Academic Press, Inc. New York 1967), pages 123–173, Chapter B4, entitled "Gel Permeation Chromatography" by K. H. Altgelt and J. C. Moore as well as in Bulletin #2-2064 by Waters Associates Inc. entitled "Gel Permeation Chromatograph".

As pointed out above, the proportions of trimethyl end-blocked poly(dimethylsiloxane) fluid to poly(diorganosiloxane) polymer in the compositions of this invention can range from about 90 to about 99.93 parts by weight of the trimethyl end-blocked poly(dimethylsiloxane) fluid to about 10 to about 0.07 parts by weight of the poly(diorganosiloxane) polymer and more preferably from about 97 to about 99.85 parts by weight of the trimethyl endblocked poly(dimethylsiloxane) fluid to about 3 to about 0.15 parts by weight of the poly(diorganosiloxane) polymer with the proviso that said proportions of the trimethyl endblocked poly(dimethylsiloxane) fluid and poly(diorganosiloxane) polymer are selected such that said composition of said fluid and said polymer has a viscosity of about 20 to about 100 centistokes at about 25° C., and more preferably about 25 to about 50 centistokes at about 25° C., the most preferred viscosity of said compositions being about 30 to about 35 centistokes at about 25° C. Of course, it is understood that the viscosity of said compositions is also measured by ASTM D-445 at about 25° C.

The novel silicone compositions of this invention have improved resistance to spray flammability. It has been unexpectedly found that the small amount of high molecular weight poly(diorganosiloxane) polymer added to low viscosity trimethyl end-blocked poly(dimethylsiloxane) fluid makes a spray pattern of the silicone composition less likely to ignite and/or support combustion than that of a non-blended trimethyl end-blocked poly(dimethylsiloxane) fluid of the same viscosity. Thus, the silicone compositions of this invention extend self-extinguishing and in some instances nonignitable characteristics to spray patterns of low viscosity trimethyl end-blocked poly(dimethylsiloxane) fluids which fluids by themselves (i.e. not blended with a high molecular weight poly(diorganosiloxane) polymer) are more highly combustible when sprayed, without adversely effecting the beneficial properties attributed to the low viscosity trimethyl end-blocked poly(dimethylsiloxane) fluids.

While not wishing to be bound by any precise theory, it is believed that the small amount of poly(diorganosiloxane) polymer added to the low viscosity trimethyl end-blocked poly(dimethylsiloxane) fluid alters the rheology of the silicon mixture in such a way as to hinder formation of separate particles needed for atomization. For instance, when sprayed through a nozzle under identical conditions in which trimethyl end-blocked poly(dimethylsiloxane) fluid per se is combustible, the silicone composition of this invention emerges into a much narrower stream, with very little divergence, and greatly reduced amounts of atomized liquid. The stream has noticably larger liquid particles and greater linear velocity. Under these conditions the silicone compositions of this invention are more difficult to ignite even when sprayed through a flame. As the amount of high molecular weight poly(diorganosiloxane) polymer additive is reduced the spray pattern begins to return to normal (i.e. that of a trimethyl end-blocked poly(dimethylsiloxane) fluid per se) and ignition tendency becomes progressively greater in those areas involving closed or sealed systems which operate under pressure and in which a low spray flammability rating is required or desired for the liquid.

Thus, another aspect of this invention relates to a process for improving the spray flammability resistance of a trimethyl end-blocked poly(dimethylsiloxane) fluid having a viscosity of about 7 to about 50 centistokes at about 25° C. which comprises mixing about 90 to about 99.93 parts by weight of said fluid with about 10 to about 0.07 parts by weight of a poly(diorganosiloxane) polymer having a weight average molecular weight of at least about 60,000 to form a silicone composition having a viscosity of about 20 to about 100 centistokes at 25° C.

The preparation of the novel silicone compositions of this invention can be carried out in any conventional mixing manner. The trimethyl end-blocked poly(dimethylsiloxane) fluid and poly(diorganosiloxane) polymer need only be mixed or blended together in any order in the proportions desired while stirring at room temperature or slightly elevated temperatures so as to dissolve said polymer in said fluid and form a silicone composition having the desired final viscosity given above. Of course, it is understood that the preferred embodiments of the various fluids and polymers employable in the novel process of this invention as well as the composition product obtained therefrom are the same as already pointed out above with regard to the novel silicone compositions of this invention.

The silicone compositions of this invention have a wide range of utility and can be employed in the same areas that have employed low viscosity trimethyl end-blocked poly(dimethylsiloxane) fluids. For example, the silicone compositions of this invention can be employed as hydraulic fluids, heat transfer fluids, transformer coolants, dielectric mediums, and the like and are obviously especially useful in those areas involving closed or sealed systems which operate under pressure and in which a low spray flammability rating is required or desired for the liquid.

It is to be understood that the silicone compositions of this invention, if desired, can contain additional ingredients so long as they do not adversely affect the spray flammability resistance of the novel silicone compositions of this invention or their desired end use such as, e.g. conventional additives in the conventional used quantities commonly employed in hydraulic fluids, heat transfer fluids, transformer coolants, dielectric mediums and the like, e.g. antioxidants, corrosion and stain inhibitors, HCl scavengers, anti-wear additives, electrical grade solvents, and the like, although such additives are not required by the applicant's instant invention.

Another aspect of this invention relates to the preferred use of the novel compositions of this invention as liquid dielectric compositions in numerous electrical devices, particularly in closed systems. For example, the novel compositions of this invention are particularly useful as liquid dielectric insulating and coolant compositions for transformers and capacitors. Other electrical devices which commonly employ dielectric fluids are e.g. electrical cables, rectifiers, electromagnets, switches, fuses, circuit breakers, while such dielectric fluids are also commonly employed as coolants and insulators for dielectric devices and such as transmitters, receivers, fly-back coils, sonar bouys, toys and military "black boxes" as disclosed e.g. in U.S. Pat. No. 3,984,338. Of course, it is understood that the specific type of electrical device or system e.g. transformer or capacitor is not critical and need not be described herein for such electrical devices and systems are conventional. Likewise, the method of employing the novel liquid dielectric compositions of this invention in such applications (be they, e.g. as a reservoir of liquid or as an impregnant) are also well known to those skilled in the art.

Accordingly, another aspect of this invention relates to an improved electrical device containing a liquid dielectric composition wherein the improvement comprises employing as the liquid dielectric composition a composition consisting essentially of about 90 to about 99.93 parts by weight of a trimethyl end-blocked poly(-dimethylsiloxane) fluid having a viscosity of about 7 to about 50 centistokes at about 25° C. and (B) from about 10 to about 0.07 parts by weight of a poly(diorganosiloxane) polymer having a weight average molecular weight of at least about 60,000 with the proviso that said composition of (A) and (B) has a viscosity of about 20 to about 100 centistokes at about 25° C.

It is, of course, understood that the preferred embodiments of said liquid dielectric compositions of this invention employable in said electrical devices are the same as already pointed out above with regard to the novel silicone compositions of this invention, while the most preferred embodiments of such compositions which furnish the particular desired dielectric, insulating, coolant and spray flammability resistance properties for a given composition in a given electrical device or system are readily determinable by routine experimentation. Moreover, as pointed out above, the liquid dielectric compositions of this invention can contain small amounts of conventional additives such as HCl scavengers, corrosion inhibitors, and the like, normally employed in such compositions so long as they do not have an adverse affect on the performance of the compositions of this invention, although such additives are not required by applicant's instant invention.

The following examples illustrate the present invention and are not to be regarded as limitative. It is to be understood that all parts, percentages and proportions referred to herein and in the claims are by weight unless otherwise indicated.

TEST PROCEDURES

Flame Propagation Test I

Each fluid tested was preheated to 140° F. and sprayed through an 80° hollow cone spray nozzle (rated at 1½ gallon per hour with No. 2 fuel oil) at 100 psig. in accordance with the procedure described in Factory Mutual Research's Bulletin FMTP 6930, June 13, 1975, entitled "Test Procedure-Less Hazardous Hydraulic Fluid." A hand held propane torch was introduced into the spray pattern at about 18 inches from the nozzle and the ignition characteristics noted. If no ignition was obtained the torch was moved slowly up and down the length of the spray pattern and the ignition characteristics noted again. A fluid is rated as self-extinguishing if the flame self-extinguishes within 5 seconds after removal of the torch from the spray. This flame propagation test was employed in Examples 1 to 5 below.

Flame Propagation Test II

Approximately one-half gallon of the liquid to be tested was poured into a steel container (5 pound $CO_2$ extinguisher) and the entire container immersed in a bath of hot oil at 200° C., the level of the oil being just below the neck of the container. Said container was fitted with a piece of ⅜ inch outside diameter by 18 guage steel tubing bent at a right angle 7 inches above the mouth of the container and extending 18 inches from said angle and which contained a shut-off valve and an 80° hollow cone spray, 1.5 gallons per hour, No. 2 fuel oil burner nozzle with a thermocouple located at the tip of the nozzle screen. The container and test liquid contained therein was then heated until the bulk liquid temperature reached 150° C. as indicated by a thermocouple immersed in the test liquid. The container was shaken periodically to minimize temperature gradients. When the test liquid temperature reached 150° C. the container was withdrawn from the bath and pressurized to 150 psig. with nitrogen. The value was then fully opened and liquid purged through the tubing until the thermocouple located at the tip of the nozzle screen indicated a temperature of 90° C. This required approximately 15 to 30 seconds. When the temperature reached 90° C. the atomized spray was directed into an open draft-free area 10'×20'×15' high and a propane-air torch flame introduced at a distance of 6 inches from the nozzle. The flame was introduced to the spray envelope for approximately one second and removed. Ignition and burning of the test liquid, if established, was observed to determine the time for the flame to self-extinguish after removal of the ignition source. Timing was started when the torch flame left the nozzle. Consecutive attempts at ignition were made for each liquid tested until the liquid temperature at the nozzle exceeded 110° C. This required approximately about 45 to about 90 seconds enabling about 10 to about 20 attempts per test. If combustion continued longer than five seconds the flame was manually extinguished by interrupting the spray and the ignition attempts continued. Ratings of less than five seconds to self-extinguishment are indicative of good spray flammability resistance, the lower the rating the better the resistance, while a rating of zero indicates that the silicone composition tested did not ignite at all during the test. This flame propagation test was employed in Examples 6 to 18 below.

EXAMPLE 1

A one-half gallon sample of trimethyl end-blocked poly(dimethylsiloxane) fluid having a viscosity of 20 centistokes at about 25° C. was tested for spray flammability according to Flame Propagation Test I described above. The siloxane fluid spray ignited instantly and burned vigorously without self-extinguishing.

EXAMPLE 2

The test procedure in Example 1 was repeated using a trimethyl end-blocked poly(dimethylsiloxane) fluid having a viscosity of 50 centistokes at 25° C. Again the siloxane fluid ignited instantly and burned vigorously without self-extinguishing. This Test was repeated a week later with the same results.

EXAMPLE 3

The test procedure in Example 1 was repeated using a trimethyl end-blocked poly(dimethylsiloxane) fluid having a viscosity of 100 centistokes at 25° C. Again the siloxane fluid ignited instantly and burned vigorously, except this time the burning liquid self-extinguished within five seconds.

EXAMPLE 4

A silicone composition consisting of about 98.5 parts by weight of a trimethyl end-blocked poly(dimethylsiloxane) fluid having a viscosity of 20 centistokes at 25° C. and about 1.5 parts by weight of a silicone gum copolymer consisting essentially of dimethylsiloxy units and methylvinylsiloxy units, said copolymer having a weight average molecular weight of about 478,000 and about 0.2 weight percent of methylvinylsiloxy units, was prepared by thoroughly mixing said fluid and said copolymer. The silicone composition of said fluid and said copolymer had a viscosity of about 50 centistokes at 25° C.

The test procedure of Example 1 was then repeated using said above prepared silicone composition. The silicone composition spray did not ignite even when the torch was moved slowly up and down the length of the spray pattern. This test was repeated a week later with the same results.

EXAMPLE 5

A silicone composition consisting of about 99.25 parts by weight of a trimethyl end-blocked poly(dimethylsiloxane) fluid having a viscosity of 20 centistokes at 25° C. and about 0.75 parts by weight of a silicone gum copolymer consisting essentially of dimethylsiloxy units and methylvinylsiloxy units, said copolymer having a weight average molecular weight of about 478,000 and about 0.2 weight percent of methylvinylsiloxy units was prepared by thoroughly mixing said fluid and said copolymer. Said silicone composition of said fluid and said copolymer had a viscosity of about 32 centistokes at about 25° C.

The test procedure of Example 1 was then repeated using said above prepared silicone composition. The silicone composition spray exhibited intermittent and sporatic flashes of ignition each of which self-extinguished almost immediately.

EXAMPLES 6 TO 18

A series of silicone fluid compositions was tested for spray flammability according to Flame Propagation Test II described above, using three similar 80° hollow cone spray (1.5 gallons per hour, No. 2 fuel oil burner) nozzles of different manufactures, i.e. a Delavan nozzle (Delavan Mfg. Co.), a Boston nozzle (Lynn Products Co.) and a Steinen nozzle (Wm. Steinen Mfg. Co.)

The silicone compositions employed and tested are identified in TABLE I as Siloxanes A to K and were as follows.

Siloxane A represents a trimethyl end-blocked poly(-dimethylsiloxane) fluid having a viscosity of 50 centistokes at about 25° C.

Siloxane B represents a trimethyl end-blocked poly(-dimethylsiloxane) fluid having a viscosity of 20 centistokes at about 25° C.

Siloxane C represents a thoroughly mixed silicone composition of about 83 parts by weight of a trimethyl end-blocked poly(dimethylsiloxane) fluid having a viscosity of 20 centistokes at 25° C. and about 17 parts by weight of a trimethyl end-blocked poly(dimethylsiloxane) polymer having a weight average molecular weight of about 30,000 (viscosity of 1000 centistokes at about 25° C.).

Siloxane D represents a thoroughly mixed silicone composition of about 92 parts by weight of a trimethyl end-blocked poly(dimethylsiloxane) fluid having a viscosity of 20 centistokes at about 25° C. and about 8 parts by weight of a trimethyl end-blocked poly(dimethylsiloxane) polymer having a weight average molecular weight of about 62,000 (viscosity of 10,000 centistokes at about 25° C.).

Siloxane E represents a thoroughly mixed silicone composition of about 95 parts by weight of a trimethyl end-blocked poly(dimethylsiloxane) fluid having a viscosity of 20 centistokes at about 25° C. and about 5 parts by weight of a trimethyl end-blocked poly(dimethylsiloxane) polymer having a weight average molecular weight of about 166,000 (viscosity of 100,000 centistokes at 25° C.)

Siloxane F represents a thoroughly mixed siloxane composition of about 96.5 parts by weight of a trimethyl end-blocked poly(dimethylsiloxane) fluid having a viscosity of 20 centistokes at 25° C. and about 3.5 parts by weight of a trimethyl end-blocked poly(dimethylsiloxane) polymer having a weight average molecular weight of about 336,000 (viscosity of 500,000 centistokes at 25° C.).

Siloxane G represents a thoroughly mixed silicone composition of about 99.25 parts by weight of a trimethyl end-blocked poly(dimethylsiloxane) fluid having a viscosity of 20 centistokes at about 25° C. and about 0.75 parts by weight of a trimethyl end-blocked poly(dimethylsiloxane) polymer gum having a weight average molecular weight of about 942,000.

Siloxane H represents a thoroughly mixed silicone composition of about 99.25 parts by weight of a trimethyl end-blocked poly(dimethylsiloxane) fluid having a viscosity of 20 centistokes at about 25° C. and about 0.75 parts by weight of a silicone gum terpolymer consisting essentially of about 94.8 weight percent of dimethylsiloxy units, about 5 weight percent of diphenylsiloxy units and about 0.2 weight percent of methylvinylsiloxy units, said terpolymer having a weight average molecular weight of about 792,000.

Siloxane I represents a thoroughly mixed silicone composition of about 99.85 parts by weight of a trimethyl end-blocked poly(dimethylsiloxane) fluid having a viscosity of 20 centistokes at about 25° C. and about 0.15 parts by weight (1500 ppm) of a trimethyl end-blocked poly(dimethylsiloxane) polymer gum having a weight average molecular weight of about 942,000.

Siloxane J represents a thoroughly mixed silicone composition of about 99.7 parts by weight of a trimethyl end-blocked poly(dimethylsiloxane) fluid having a viscosity of 20 centistokes at about 25° C. and about 0.3 parts by weight (3000 ppm) of a trimethyl end-blocked poly(dimethylsiloxane) polymer gum having a weight average molecular weight of about 942,000.

Siloxane K represents a thoroughly mixed silicone composition of about 99.25 parts by weight of a trimethyl end-blocked poly(dimethylsiloxane) fluid having a viscosity of 20 centistokes at about 25° C. and about 0.75 parts by weight (7500 ppm) of a trimethyl end-blocked poly(dimethylsiloxane) polymer gum having a weight average molecular weight of about 942,000.

The results of said tests along with the final viscosity in centistokes at about 25° C. for each silicone composition tested are given in TABLE I below. Example 2 was a repeat of Example 1 conducted one week later, while control Example 18 was carried out after all the other Examples using a Steinen nozzle were completed to insure that the spray pattern of the nozzle had not changed.

TABLE I

| Example Number | Silicone Composition | Viscosity (cSt) of Silicone Composition | Time to Self-Extinguish in Seconds | | |
|---|---|---|---|---|---|
| | | | Delavan Nozzle | Boston Nozzle | Steinen Nozzle |
| 6 | Siloxane A | 50 | 1–3 | 2–5 | 5+ |
| 7 | Siloxane A | 50 | 0–1 | 2–4+ | 5+ |
| 8 | Siloxane B | 20 | Not Tested | 5+ | 5+ |
| 9 | Siloxane C | 49.0 | Not Tested | 5+ | 5+ |
| 10 | Siloxane D | 48.0 | Not Tested | 4–5+ | 5+ |
| 11 | Siloxane E | 49.3 | Not Tested | 3–5+ | 5+ |
| 12 | Siloxane F | 48.5 | Not Tested | 1–3 | 2–3 |
| 13 | Siloxane G | 30.8 | Not Tested | 0 | 0 |
| 14 | Siloxane H | 29.0 | Not Tested | 1–2 | 1–2 |
| 15 | Siloxane I | 22 | Not Tested | 2–3 | 2–5+ |
| 16 | Siloxane J | 24 | Not Tested | Not Tested | 0–1 |
| 17 | Siloxane K | 30 | Not Tested | Not Tested | 0 |
| 18 | Siloxane A | 50 | Not Tested | Not Tested | 5+ |

The differences in the range of times for self-extinguishment between the three similar nozzles employed in said Examples 6 to 18 is due to the different quality of said nozzles and to the slight variations in the spray patterns of said nozzles. However, with identical nozzles the time for a silicone composition to self-extinguish is reproducible. The above results demonstrate that by blending low viscosity trimethyl end-blocked poly(dimethylsiloxane) fluids with a small amount of a high molecular weight poly(diorganosiloxane) polymer, silicone compositions having significantly improved spray flammability resistance can be obtained. Note that the silicone composition in Examples 13 and 17 even failed to ignite during said tests.

Various modifications and variations of this invention will be obvious to a worker skilled in the art and it is to be understood that such modifications and variations are to be included within the purview of this application and the spirit and scope of the appended claims.

What is claimed is:

1. A silicone composition consisting essentially of (A) from about 90 to about 99.93 parts by weight of a trimethyl end-blocked poly(dimethylsiloxane) fluid having a viscosity of about 7 to about 50 centistokes at about 25° C. and (B) from about 10 to about 0.07 parts by weight of a poly(diorganosiloxane) polymer having a weight average molecular weight of at least about 60,000 selected from the group consisting of a dimethylsiloxane homopolymer, a copolymer consisting essentially of dimethylsiloxy and methylvinylsiloxy units and a terpolymer consisting essentially of dimethylsiloxy, diphenylsiloxy and methylvinylsiloxy units, with the proviso that said composition of (A) and (B) has a viscosity of about 20 to about 100 centistokes at about 25° C.

2. A composition as defined in claim 1, wherein said trimethyl end-blocked poly(dimethylsiloxane) fluid has a viscosity of about 10 to 30 centistokes at about 25° C.

3. A composition as defined in claim 1 wherein said silicone composition consists essentially of about 97 to about 99.85 parts by weight of said trimethyl end-blocked poly(dimethylsiloxane) fluid and about 3 to about 0.15 parts by weight of said poly(diorganosiloxane) polymer.

4. A composition as defined in claim 1, wherein said silicone composition has a viscosity of about 25 to about 50 centistokes at about 25° C.

5. A composition as defined in claim 1 wherein said silicone composition has a viscosity of about 30 to about 35 centistokes at about 25° C.

6. A composition as defined in claim 1, wherein said poly(diorganosiloxane) polymer is a dimethylsiloxane homopolymer.

7. A composition as defined in claim 1, wherein said poly(diorganosiloxane) polymer is a copolymer consisting essentially of dimethylsiloxy and methylvinylsiloxy units.

8. A composition as defined in claim 1, wherein said poly(diorganosiloxane) polymer is a terpolymer consisting essentially of dimethylsiloxy, diphenylsiloxy and methylvinylsiloxy units.

9. A composition as defined in claim 1 wherein the trimethyl end-blocked poly(dimethylsiloxane) fluid has a viscosity of about 10 to 30 centistokes at about 25° C., wherein said silicone composition consists essentially of about 97 to about 99.85 parts by weight of said trimethyl end-blocked poly(dimethylsiloxane) fluid and about 3 to about 0.15 parts by weight of said poly(diorganopolysiloxane) polymer having a weight average molecular weight of at least about 400,000 and wherein said silicone composition has a viscosity of about 25 to about 50 centistokes at about 25° C.

10. A composition as defined in claim 9, wherein said silicone composition has a viscosity of about 30 to about 35 centistokes at about 25° C.

11. A composition as defined in claim 10, wherein said poly(diorganopolysiloxane) polymer is a dimethylsiloxane homopolymer.

12. A composition as defined in claim 10, wherein said poly(diorganopolysiloxane) polymer is a copolymer consisting essentially of dimethylsiloxy and methylvinylsiloxy units.

13. A composition as defined in claim 10, wherein said poly(diorganosiloxane) polymer is a terpolymer consisting essentially of dimethylsiloxy, diphenylsiloxy and methylvinylsiloxy units.

14. A composition as defined in claim 1, wherein said poly(diorganosiloxane) polymer has a weight average molecular weight of at least about 400,000.

15. A process for improving the spray flammability resistance of a trimethyl end-blocked poly(dimethylsiloxane) fluid having a viscosity of about 7 to about 50 centistokes at about 25° C., said process comprising mixing about 90 to about 99.93 parts by weight of said fluid with about 10 to about 0.07 parts by weight of a poly(diorganosiloxane) polymer having a weight average molecular weight of at least about 400,000 to form a silicone composition having a viscosity of about 20 to about 100 centistokes at 25° C.

16. A process as defined in claim 15, wherein said trimethyl end-blocked poly(dimethylsiloxane) fluid has a viscosity of about 10 to 30 centistokes at about 25° C.

17. A process as defined in claim 15 wherein about 97 to about 99.85 parts by weight of said trimethyl end-blocked poly(dimethylsiloxane) fluid is mixed with about 3 to about 0.15 parts by weight of said poly(diorganosiloxane) polymer.

18. A process as defined in claim 15, wherein the formed silicone composition product has a viscosity of about 25 to about 50 centistokes at about 25° C.

19. A process as defined in claim 15, wherein the formed silicone composition product has a viscosity of about 30 to about 35 centistokes at about 25° C.

20. A process as defined in claim 15, wherein the organic pendant groups of said poly(diorganosiloxane) polymer are selected from the class consisting of hydrogen, hydrocarbon radicals free of aliphatic unsaturation, halo-substituted hydrocarbon radicals and cyano-substituted hydrocarbon radicals.

21. A process as defined in claim 15, wherein said poly(diorganosiloxane) polymer consists essentially of diorganosiloxy units selected from the class consisting of dimethylsiloxy, diethylsiloxy, diphenylsiloxy, methylethylsiloxy, methylphenylsiloxy, ethylphenylsiloxy, cyanopropyl methylsiloxy, trifluoropropyl methylsiloxy, methylvinylsiloxy, ethylvinylsiloxy, phenylvinylsiloxy and divinylsiloxy units.

22. A process as defined in claim 21, wherein said poly(diorganosiloxane) polymer is a dimethylsiloxane homopolymer.

23. A process as defined in claim 21, wherein said poly(diorganosiloxane) polymer is a copolymer consisting essentially of dimethylsiloxy and methylvinylsiloxy units.

24. A process as defined in claim 21, wherein said poly(diorganosiloxane) polymer is a terpolymer consisting essentially of dimethylsiloxy, diphenylsiloxy and methylvinylsiloxy units.

25. A process as defined in claim 21, wherein said trimethyl end-blocked poly(dimethylsiloxane) fluid has a viscosity of about 10 to 30 centistokes at about 25° C., wherein about 97 to about 99.85 parts by weight of said trimethyl end-blocked poly(dimethylsiloxane fluid) is mixed with about 3 to about 0.15 parts by weight of said poly(diorganopolysiloxane) polymer, said polymer having a weight average molecular weight of at least about 400,000 and wherein the formed silicone composition product has a viscosity of about 25 to about 50 centistokes at about 25° C.

26. The process as defined in claim 25, wherein said formed silicone composition product has a viscosity of about 30 to about 35 centistokes at about 25° C.

27. A process as defined in claim 26, wherein said poly(diorganopolysiloxane) polymer is a dimethylsiloxane homopolymer.

28. A process as defined in claim 26, wherein said poly(diorganopolysiloxane) polymer is a copolymer consisting essentially of dimethylsiloxy and methylvinylsiloxy units.

29. A process as defined in claim 26, wherein said poly(diorganosiloxane) polymer is a terpolymer consisting essentially of dimethylsiloxy, diphenylsiloxy and methylvinylsiloxy units.

30. In an electrical device containing a liquid dielectric composition the improvement comprising employing as the liquid dielectric composition a silicone composition having improved spray flammability resistance consisting essentially of (A) from about 90 to about 99.93 parts by weight of a trimethyl end-blocked poly(dimethylsiloxane) fluid having a viscosity of about 7 to about 50 centistokes at about 25° C. and (B) from about 10 to about 0.07 parts by weight of a poly(diorganosiloxane) polymer having a weight average molecular weight of at least about 60,000 selected from the group consisting of a dimethylsiloxane homopolymer, a copolymer consisting essentially of dimethylsiloxy and methylvinylsiloxy units and a terpolymer consisting essentially of dimethylsiloxy, diphenylsiloxy and methylvinylsiloxy units, with the proviso that said composition of (A) and (B) has a viscosity of about 20 to about 100 centistokes at about 25° C.

31. An electrical device as defined in claim 30, wherein said poly(diorganosiloxane) polymer has a weight average molecular weight of at least about 400,000.

32. An electrical device as defined in claim 30, wherein said trimethyl end-blocked poly(dimethylsiloxane) fluid has a viscosity of about 10 to 30 centistokes at about 25° C.

33. An electrical device as defined in claim 30, wherein said silicone composition consists essentially of about 97 to about 99.85 parts by weight of said trimethyl end-blocked poly(dimethylsiloxane) fluid and about 3 to about 0.15 parts by weight of said poly(diorganosiloxane) polymer.

34. An electrical device as defined in claim 30, wherein said silicone composition has a viscosity of about 25 to about 50 centistokes at about 25° C.

35. An electrical device as defined in claim 30, wherein said silicone composition has a viscosity of about 30 to about 35 centistokes at about 25° C.

36. An electrical device as defined in claim 30, wherein said poly(diorganosiloxane) polymer is a dimethylsiloxane homopolymer.

37. An electrical device as defined in claim 30, wherein said poly(diorganosiloxane) polymer is a copolymer consisting essentially of dimethylsiloxy and methylvinylsiloxy units.

38. An electrical device as defined in claim 30, wherein said poly(diorganosiloxane) polymer is a terpolymer consisting essentially of dimethylsiloxy, diphenylsiloxy and methylvinylsiloxy units.

39. An electrical device as defined in claim 30, which is a transformer.

40. An electrical device as defined in claim 30, which is a capacitor.

41. An electrical device as defined in claim 30 wherein the trimethyl end-blocked poly(dimethylsiloxane) fluid has a viscosity of about 10 to 30 centistokes at about 25° C., wherein said silicone composition consists essentially of about 97 to about 99.85 parts by weight of said trimethyl end-blocked poly(dimethylsiloxane) fluid and about 3 to about 0.15 parts by weight of said poly(diorganopolysiloxane) polymer having a weight average molecular weight of at least about 400,000 and wherein said silicone composition has a viscosity of about 25 to about 50 centistokes at about 25° C.

42. An electrical device as defined in claim 41, wherein said silicone composition has a viscosity of about 30 to about 35 centistokes at about 25° C.

43. An electrical device as defined in claim 42, wherein said poly(diorganopolysiloxane) polymer is a dimethylsiloxane homopolymer.

44. An electrical device as defined in claim 42, wherein said poly(diorganopolysiloxane) polymer is a copolymer consisting essentially of dimethylsiloxy and methylvinylsiloxy units.

45. An electrical device as defined in claim 42, wherein said poly(diorganosiloxane) polymer is a terpolymer consisting essentially of dimethylsiloxy, diphenylsiloxy and methylvinylsiloxy units.

46. An electrical device as defined in claim 42, which is a transformer.

* * * * *